United States Patent
Vilain et al.

(10) Patent No.: US 6,426,539 B1
(45) Date of Patent: Jul. 30, 2002

(54) BOLOMETRIC DETECTOR WITH INTERMEDIATE ELECTRICAL INSULATION AND MANUFACTURING PROCESS FOR THIS DETECTOR

(75) Inventors: Michel Vilain, St. Georges de Commiers; Jean-Jacques Yon, Sassenage, both of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/604,916

(22) Filed: Jun. 28, 2000

(30) Foreign Application Priority Data

Jul. 8, 1999 (FR) .............................. 99 08862

(51) Int. Cl.⁷ .............................................. H01L 43/00
(52) U.S. Cl. .......................................... 257/425; 257/32
(58) Field of Search ............................ 250/332, 338.4; 257/467, 258, 288, 448, 32, 425; 340/584

(56) References Cited

U.S. PATENT DOCUMENTS

| | | | | |
|---|---|---|---|---|
| 4,754,139 A | * | 6/1988 | Ennulat et al. | ............. 250/332 |
| 5,021,663 A | | 6/1991 | Hornbeck | |
| 5,367,167 A | * | 11/1994 | Keenan | .................. 250/338.4 |
| 5,399,897 A | | 3/1995 | Cunningham et al. | |
| 5,850,098 A | * | 12/1998 | Butler et al. | ................ 257/467 |
| 5,912,464 A | * | 6/1999 | Villain et al. | ............. 250/338.4 |
| 6,111,254 A | * | 8/2000 | Eden | ......................... 257/258 |
| 6,222,454 B1 | * | 4/2001 | Harling et al. | ............. 340/584 |
| 6,229,144 B1 | * | 5/2001 | Ouvrier-Buffet et al. | 250/338.4 |
| 6,249,002 B1 | * | 6/2001 | Butler | ..................... 250/338.4 |

* cited by examiner

Primary Examiner—David Nelms
Assistant Examiner—Bau T Le
(74) Attorney, Agent, or Firm—Burns, Doane Swecker & Mathis LLP (57) ABSTRACT

Bolometric detector with intermediate electrical insulation and manufacturing process for this detector.

According to the invention, at least two electrodes are formed facing the same face of a layer of bolometric material (5) and starting from the same layer of conducting material (8). Areas (8A, 8B) belonging to the two electrodes are electrically isolated from each other and electrically isolated from the layer of bolometric material, while other areas (7A, 7B) belonging to the two electrodes are separated from each other and are in electrical contact with this layer. The invention is particularly applicable to infrared imagery.

8 Claims, 8 Drawing Sheets

BOLOMETRIC DETECTOR WITH INTERMEDIATE ELECTRICAL INSULATION AND MANUFACTURING PROCESS FOR THIS DETECTOR

DESCRIPTION

1. Technical Field

This invention relates to a bolometric detector and a manufacturing process for this detector.

It is particularly applicable to infrared imagery.

2. State of Prior Art

Infrared radiation detectors are already known, most of which are designed in matrix form and are capable of operating at ambient temperature, in other words without cooling, unlike devices called "quantum detectors".

These uncooled detectors usually use the variation of a property of an appropriate material as a function of the temperature, at about 300 K. For bolometric detectors, this property is the resistivity.

This type of uncooled detector usually combines (a) means of absorption of infrared radiation and conversion of this radiation into heat, (b) thermal insulation means for the detector, so that the detector can warm up, (c) thermometry means which, in the case of a bolometric detector, use a resistive element and (d) means of reading the electrical signals output by the thermometry means.

Detectors to be used for infrared imagery are made in the form of a matrix of elementary detectors, this matrix having one or two dimensions, on a substrate that is usually made of silicon and comprises means of electrical stimulation of elementary detectors by bias of these detectors, and means of detection and preprocessing of electrical signals output by these elementary detectors. These detection and preprocessing means are formed on the substrate and form a read circuit.

Monolithic integration of detectors in the corresponding read circuit is useful from the point of view of manufacturing costs. However, it is also possible to hybridize a matrix of elementary detectors onto this read circuit.

A detector comprising a matrix of elementary detectors and the associated read circuit is usually located in a housing and is connected to the outside medium by conventional techniques. In the housing, the pressure is reduced to limit temperature losses and this housing is equipped with a window transparent to infrared radiation to be detected.

To observe a scene through this detector, the scene is projected through appropriate optics onto the matrix of elementary detectors and electrical stimuli are applied at a constant rate through the read circuit (also provided for this purpose), to each elementary detector or to each row of these detectors in order to obtain an electrical signal forming the image of the temperature reached by each elementary detector. This signal is processed more or less extensively by the read circuit and then possibly by an electronic device placed outside the housing in order to generate an image of the observed scene.

The performances and the cost of uncooled bolometric detectors depend essentially (1) on control over the production and integration of the very high performance bolometric materials, (2) control of the manufacture of microbridges which are light and fragile structures capable of thermally isolating elementary detectors in the read circuit, (3) the construction quality of these detectors and various correction functions that are used in the read circuit and in other peripheral devices and (4) control of techniques and the cost of packaging in a housing.

This invention is related to point (1) above, and can be used to obtain very high performance bolometric detectors using relatively simple techniques.

A bolometric detector based generally on amorphous silicon is described in the following document:

[1] U.S. Pat. No. 5,021,663 A (L. J. Hornbeck).

This known detector has many disadvantages and particularly (1) a large number of different layers is necessary to manufacture it, particularly two parallel electrically conducting layers located on each face of the layer of the bolometric material in the detector, and (2) it is not possible to adjust the electrical resistance of this detector on a given surface, except by modifying the resistivity or the thickness of the bolometric material.

Another bolometric detector is described in the following document:

[2] U.S. Pat. No. 5,367,167 A (W. F. Keenan).

This other known detector comprises two coplanar electrodes located on the same face of the layer of bolometric material (usually made of amorphous silicon) and an electrically conducting layer that is located on the other face of this layer of bolometric material. The function of this conducting layer is to absorb the infrared radiation that is to be detected and it must be separated from the body of the detector by an electrically insulating layer.

The detector defined in document [2] corrects some disadvantages of the detector known according to document [1], but it still has disadvantages (1) and (2) mentioned above.

Furthermore, a bolometric detector with microbridges is described in the following document, which should be referred to:

[3] FR 2752299 A corresponding to EP 0828145 A and the American patent application Ser. No. 08/905059, Aug. 1, 1997 (M. Vilain and J. J. Yon).

The detector known as described in this document [3] does not have the disadvantages (1) and (2) mentioned above. It uses a single electrically conducting layer that is directly in contact with the bolometric material. In this case, the electrodes are formed from this single layer which also performs an optical absorption function.

The structure of an elementary detector according to the information given in document [3] is simpler than the structure of a detector made in accordance with document [1] or [2], and the electrical resistance of this detector can be adjusted within a wide resistance range for a given available detector area and for a given thickness and conductivity of the bolometric material used.

Therefore, the resistance can be optimized to obtain good coupling with the read circuit with limited constraints on the optimization of other detector parameters, namely (1) the thickness of the bolometric material on which the thermal capacity Cth and the thermal insulation Rth of the detector partly depend, and therefore the thermal time constant of this detector equal to the product of Cth and Rth and (2) the resistivity of the bolometric material that controls the TCR coefficient of the bolometric material, in other words the logarithmic derivative of the electrical resistance of this material with respect to the temperature.

However, note that the design of the electrically conducting elements (control electrodes and possibly electrically floating electrodes) must obey specific criteria in order to optimize the efficiency of the optical absorption function and finally the performances of the bolometric detector; in particular, the "pitch" of this design, in other words the sum of the values l and e in the example in FIG. 2 that will be described later, must be between 5 µm and 10 µm for optimized detection of infrared radiation with wavelengths between 8 µm and 14 µm. Furthermore, it is preferable that the values of l and e are similar. A reduction of e will cause an increase in the electrical noise level and an increase in e will tend to reduce this noise level but the resulting loss of optical absorption is preponderant.

DISCLOSURE OF THE INVENTION

The design of the bolometric detector described in document [3] is valid from the point of view of the compromise between performances and cost due to the simplicity of the structure of this detector which gives high efficiencies, but an attempt is made to significantly improve these performances by improving this structure.

Another purpose of this invention is to achieve this improvement and proposes a bolometric detector with excellent performances regardless of the bolometric material used, for example amorphous silicon, or a comparable material which naturally has a high level of low frequency noise, while keeping most of the advantages of the bolometric detector described in document [3].

In this known detector, geometric constraints are imposed on the surfaces of the electrodes (width and pitch).

In this invention, these constraints are overcome by means of additional electrical insulation in order to dissociate the constraints imposed in space between the electrodes, from constraints on the absorption of incident radiation. This thus increases the performances of the detector by a noise reduction and an increase in optical absorption.

More precisely, the purpose of this invention is a bolometric detector comprising a layer of bolometric material (material for which the resistivity varies as a function of the temperature) and at least two electrodes formed facing the same face of this layer of bolometric material and starting from the same layer of electrically conducting material, this detector being characterized in that each of the two electrodes comprises at least a first area and at least a second area, in that the second areas belonging to the two electrodes respectively are electrically isolated from each other and electrically isolated from the layer of bolometric material, and in that the first areas belonging to the two electrodes are at a spacing from each other and are in electrical contact with this layer of bolometric material.

According to a first particular embodiment of the device according to the invention, the second areas are electrically isolated from the layer of bolometric material by a layer of electrically insulating material.

For example, this electrically insulating material may be chosen from the group comprising silicon nitride and silica.

According to a second particular embodiment of the device according to the invention, the second areas are electrically isolated from the layer of bolometric material by a space in which there is no material.

Preferably, the bolometric material is chosen in the group comprising amorphous silicon, vanadium oxides, amorphous SiGe and $Si_xGe_yC_z$ where $x \geq 0, y \geq 0, z \geq 0$ and $x+y+z=1$.

For example, the electrically conducting material may be titanium nitride.

According to a preferred embodiment of the invention, the bolometric detector has a microbridge structure.

This invention also relates to a bolometric detector with a matrix structure comprising at least two detectors conform with the invention.

This invention also relates to a manufacturing process for the bolometric detector defined in the invention, in which a first auxiliary sacrificial layer is formed on a substrate, the layer of bolometric material and the electrodes are formed on this first auxiliary layer, by electrically isolating the second areas of electrodes from the layer of bolometric material and eliminating the first auxiliary layer.

According to a first particular embodiment of the process according to the invention, the layer of electrically insulating material is also formed to separate the second areas from the layer of bolometric material.

According to a second particular embodiment, a second auxiliary sacrificial layer is also formed to separate the second areas from the layer of bolometric material, and this second auxiliary layer is also eliminated.

BRIEF DESCRIPTION OF THE DRAWINGS

This invention will be better understood after reading the following description of example embodiments, given for information only and in no way restrictive, with reference to the attached drawings in which.

DETAILED DISCLOSURE OF PARTICULAR EMBODIMENTS

In FIGS. 1 to 10B, the same references represent the same elements.

Figure 1:
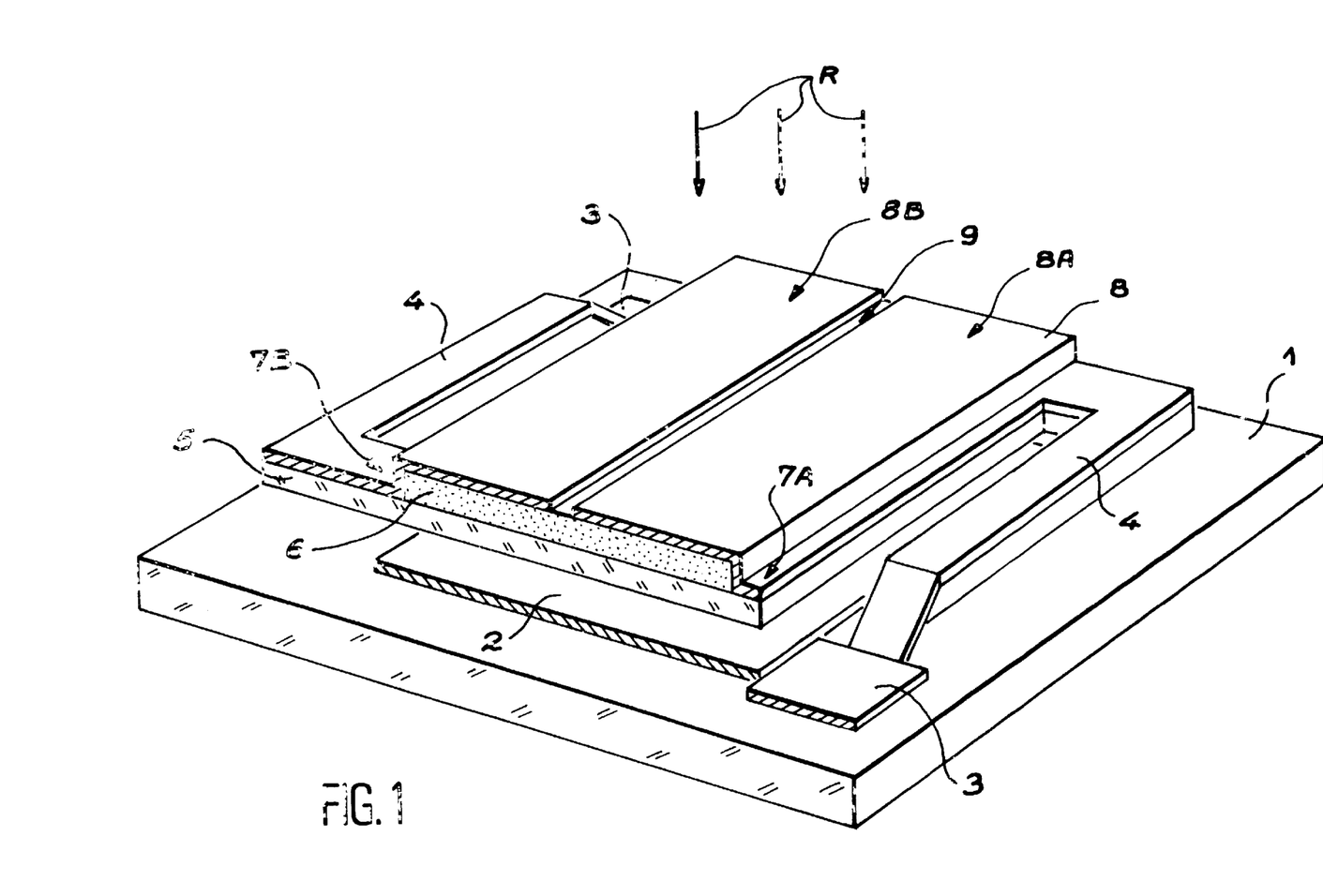
FIG. 1 is a diagrammatic perspective view of a particular embodiment of the bolometric detector according to the invention, comprising two parallel electrodes.

The bolometric detector according to the invention that is diagrammatically shown in perspective in FIG. 1 comprises a substrate 1, for example made of silicon, comprising electronic devices (not shown) for example made of CMOS technology (or a similar technology), these devices being capable of applying stimuli necessary for operation of the detector and "reading" information output from the bolometer or bolometers forming part of this detector.

A layer 2 that is optically reflecting in the infrared domain may be placed on the surface of substrate 1, in a manner known in the state of the art.

One or several bolometers are formed on substrate 1 (a single bolometer in the example in FIG. 1), each bolometer being mechanically connected to substrate 1 and electrically connected to the devices formed on this substrate, using at least two appropriate structures 3 (for example pillars, in a manner known in the state of the art) that are capable of positioning the corresponding bolometer about 2.5 µm from the substrate surface when the substrate comprises the reflecting layer 2.

In a manner known in the state of the art, each bolometer is thermally isolated from the substrate and is held in place mechanically with respect to the substrate by means of at least two support arms 4, each of which is connected to one of the structures 3, as can be seen in FIG. 1. Apart from the structures or areas 3, there is no material in the space between the substrate and the bolometer; a heavy gas is injected at low pressure inside this space, for example such as xenon or a residual gas pressure (by placing the detector in a containment in which a vacuum is created).

This type of detector forms a structure with microbridges.

Each bolometer also comprises a layer 5 of a bolometric material (which is therefore resistive), the thickness of which is of the order of 50 nm to 100 nm and which may for example be made of doped amorphous silicon.

This bolometer also comprises a layer 6 of an electrically insulating material (for example $SiO_2$) the thickness of which is of the order of 5 nm to 20 nm and which is formed on top of layer 5. This layer 6 is eliminated down to the layer of bolometric material 5 on at least two areas 7A and 7B.

Each bolometer also comprises a layer 8 of electrically conducting material which is formed on the electrically insulating layer 6 and also on the layer 5 at areas 7A and 7B. This conducting layer 8 is eliminated down to layer 6 over at least one area 9 with a sufficient extension to form at least two conducting patterns 8A, 8B electrically isolated from each other, in each bolometer, starting from layer 8 in the bolometer.

The layer 8 extends on arms 4 to connect the conducting patterns 8A and 8B to areas 3, and therefore to the devices in substrate 1, respectively.

Each of the two conducting patterns 8A and 8B is associated with one of the areas 7A and 7B (where the conducting layer 8 is located) to form an electrode of the detector. This detector thus comprises two electrodes 8A–7A and 8B–7B.

FIG. 1 shows that this detector is oriented such that the infrared radiation R to be detected arrives from the direction of the detector electrodes.

Figure 2:
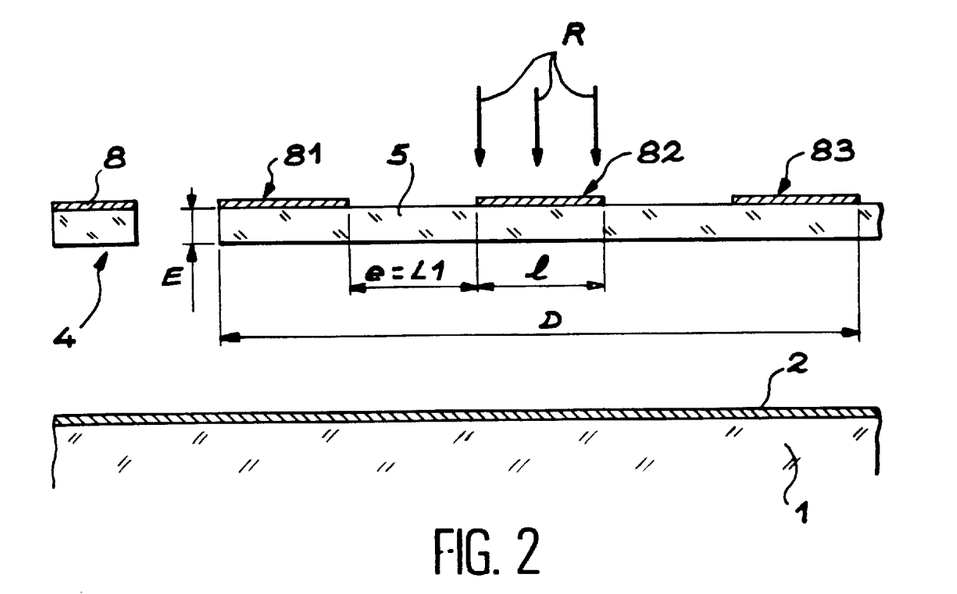
FIG. 2 is a diagrammatic sectional view of a bolometric detector according to the information in document [3]

FIG. 2 is a diagrammatic sectional view of a detector according to the information given in document [3] and the isolated part to the left of this Figure shows a cross-sectional view through the thermal insulation structure (support arm) according to a preferred configuration. For comparison, FIG. 3 is a diagrammatic sectional view of a detector according to the invention.

Figure 3:
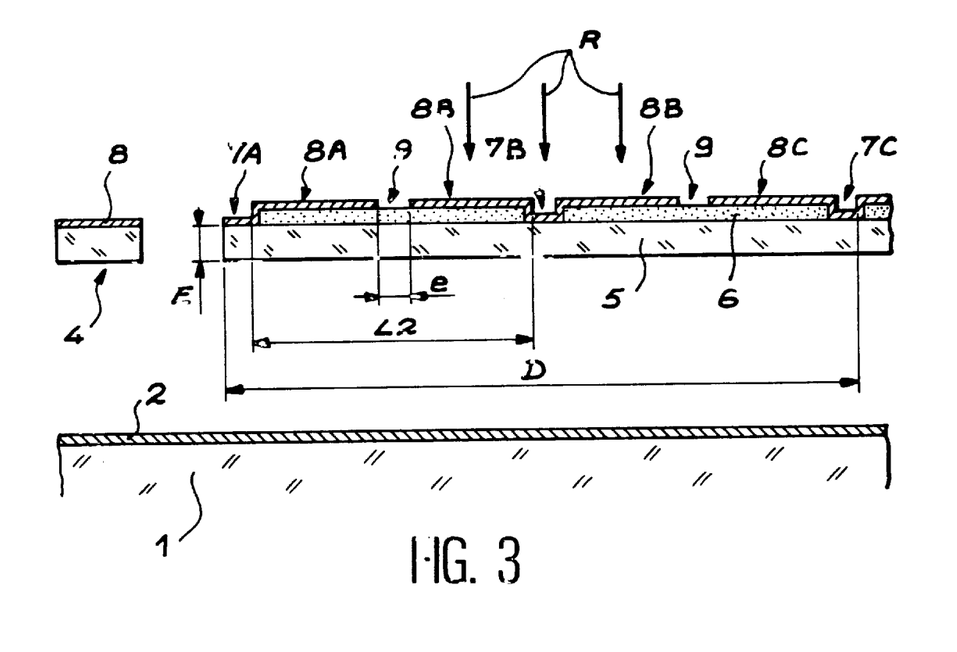
FIG. 3 is a diagrammatic sectional view of a bolometric detector according to the invention.

In the case shown in FIG. 1, it was seen that there were two electrodes 8A and 8B, whereas in the more general configuration in FIG. 2, three electrodes 81, 82 and 83 can be seen, and in the case in FIG. 3 that also corresponds to a more general configuration of FIG. 1, three electrodes 8A–7A, 8B–7B and 8C–7C can also be seen. Note that some electrodes are not necessarily connected to the read circuit. This type of pattern is called "floating electrode".

We will now consider a simplified model of the detector according to the invention in FIG. 1. In operation, a read voltage v is applied to this detector using electrical inputs materialized by areas 3. In the lack of infrared illumination of the single bolometer included in the detector, the result is passage of a current with an intensity i equal to v/R, where R is the electrical resistance of the bolometer between the two inputs 3.

This detector is characterized by the bolometric material acting as a thermometer since its resistivity varies with the temperature T. This variation is expressed by the coefficient TCR being equal to dR/(RdT). For amorphous silicon, this coefficient is negative and is of the order of −1.5%/K to −5%/K depending on the doping of amorphous silicon.

During infrared illumination of the bolometer, an optical power dP is dissipated in the electrodes that act as absorbers and is transferred to the layer of bolometric material. The result is a current variation di such that:

$$di = TCR.i.Rth.dP.$$

The electrical noise in the resistance R is the sum of white noise (in other words independent of the frequency f), with the conventional form $\sigma i^2 = 4kT/R$ where k is Boltzman's constant, and a low frequency noise typically governed by Hooge's law:

$$\sigma i^2 (1f)/i^2 = \alpha/N.f$$

where $\alpha$ is Hooge's parameter (constant for a given material) and N is the total number of electrical carriers involved in the conduction process; N is equal to W.L.E.n where W and L are the electrical width and electrical length of the bolometer respectively, E is the thickness of the layer of the bolometric material and n is the density of the mobile electrical charge carriers. Therefore the spectral density of low frequency noise is expressed by the following formula:

$$\sigma i^2 (1f) = i^2.\alpha/n.(1/W.L.E)\ (1/f).$$

The signal or response di/dP is an increasing function of i and a user finds it beneficial to maximize this response and therefore the current i, to facilitate analog and/or digital processing in the read circuit.

Since the low frequency noise is an increasing function of i, the bolometer is typically dominated by noise in 1/f under optimum operating conditions, almost regardless of what bolometric material is used, and the contribution of white noise in the read pass band denoted BPCL can be ignored to simplify the problem. Under these conditions, it can be written that $\sigma i^2$ is close to:

$$i^2.\alpha/n.(1/W.L.E).Log(BPCL).$$

The signal/noise ratio $(di/dP)/\sigma i$ is then given by the following formula $$(di/dP)/\sigma i = TCR.Rth/((\alpha/n)(1/W.L.E.).Log(BPCL))^{1/2}.$$

The bolometer performance is expressed by the thermal resolution or Noise equivalent differential Temperature (NedT), this resolution being proportional to the Noise equivalent Power (NeP). This noise equivalent power is the infrared optical power dP such that di is equal to $\sigma i$. The result obtained is thus:

$$NedT = k.\alpha.(W.L.E)^{-1/2}/(TCR.Rth).$$

Assuming that the read pass band is fixed, it can be seen that the bolometer performances is fixed by the geometric construction parameters composed as follows:

(1) Rth which is defined by the geometric configuration and the constituent materials of areas 4 in FIG. 1, where Rth is as high as possible, (2) W, L and E, the product of which is equal to the electrically active volume of the bolometric material; this volume should be as large as possible, (3) TCR that is the basic characteristic of the bolometric material and which should preferably be as high as possible, and (4) a which should be as low as possible.

Comparing the value L1 of L in the case in FIG. 2 with the value L2 of L in the case in FIG. 3, where the thickness E is the same in the two Figures, it can be seen in a simplified manner that the main advantage of a detector according to the invention is that its electrically active volume or the useful volume W.L.E. is significantly higher.

Figure 4:
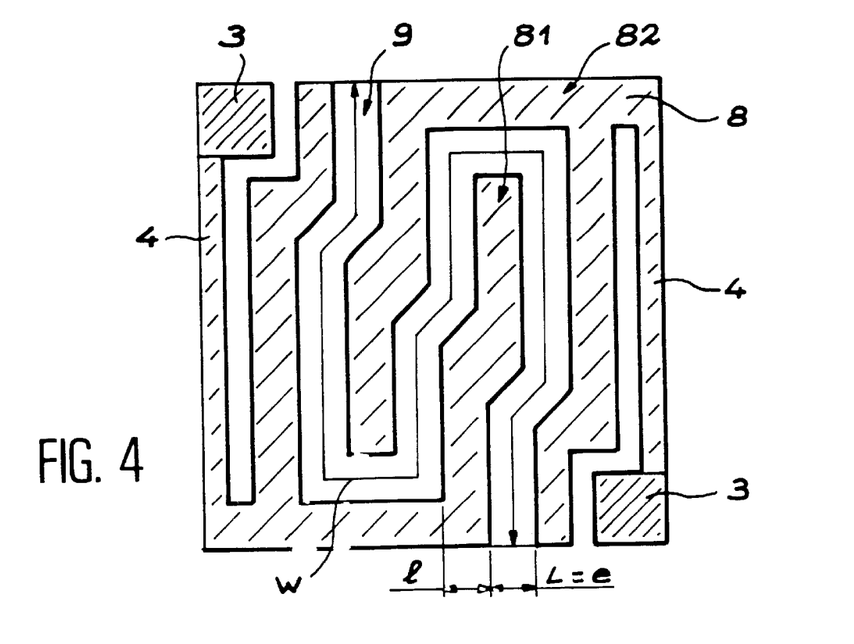
FIG. 4 is a top diagrammatic view of a bolometric detector according to the information in document [3], with two interdigital electrodes.

FIG. 4 is a diagrammatic top view of a bolometer according to the information in document [3] comprising two interdigital conducting patterns 8A and 8B. This configuration was chosen as an example, but an expert in the subject will easily verify that any other configuration of conducting patterns designed in accordance with the information in document [3] will give a good level of improvement when adapted to the invention.

Document [3] describes that the space e between two interdigital conducting patterns and the width 1 of each of these two conducting patterns must be approximately the same value, preferably of the order of 4 µm, to obtain maximum optical absorption (between 90% and 95% in the presence of a quarter wavelength cavity and a perfect reflector at the substrate surface) in the infrared band varying from 8 µm to 14 µm. The resistance of the layer of conducting patterns is preferably close to 200 Ω/square. The scale of the conducting patterns in FIG. 4 gives overall dimensions of the represented pixel that are compatible with a matrix configuration with a pitch of 40 µm along two orthogonal directions.

Figure 5:
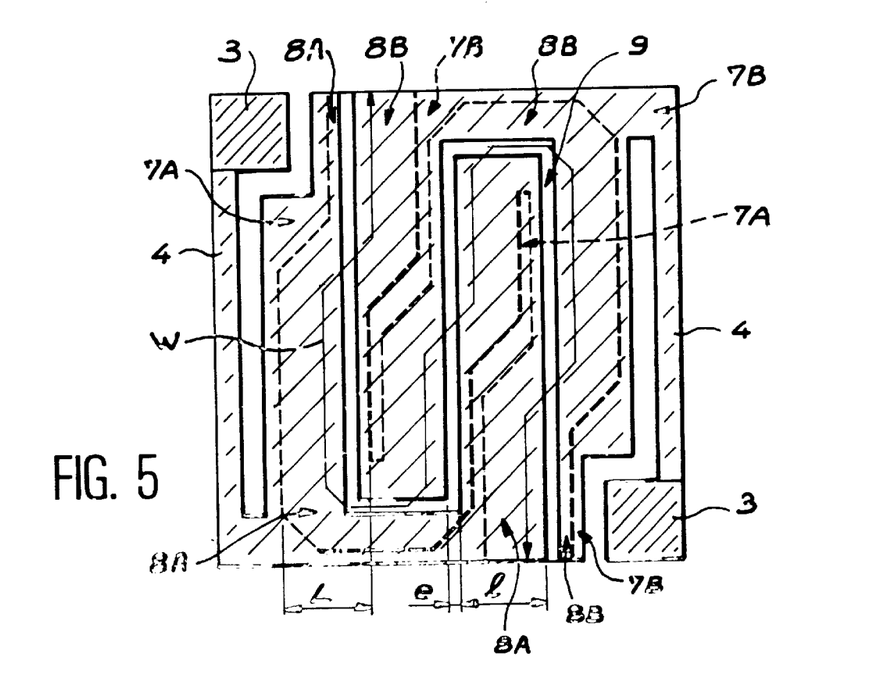
FIG. 5 is a diagrammatic top view of a bolometric detector according to the invention with two interdigital electrodes and, FIGS. 6A to 10B diagrammatically illustrate different steps in a process for manufacturing a bolometric detector according to the invention, the diagrammatic sectional views in FIGS. 6A, 7A, 8A, 9A and 10A corresponding to the diagrammatic top views in FIGS. 6B, 7B, 8B, 9B and 10B respectively.

FIG. 5 shows a bolometer according to the invention with the same overall dimensions as in FIG. 4 and with the same type of interdigital pattern of the electrodes 8A–7A and 8B–7B. The contact areas 7A and 7B between the conducting layer 8 and the layer of bolometric material 5 are laid out to be as narrow as possible, for example with a width of 1 µm.

The width e of the space 9 between the two interdigital electrodes may be approximately equal to the width 1 of the electrodes, but it is advantageously smaller than this width 1 as in the case of the configuration shown in FIG. 5 in order to improve the optical absorption of the infrared radiation.

A space e, for example of the order of 2 µm, is sufficient to separate the two electrodes without an excessive risk of short circuit.

In this case, the resistance (Rsquare) of the conducting layer 8 must be of the order of 350 Ω/square to 400 Ω/square, since the configuration of these conducting patterns is practically continuous.

FIG. 5 shows a particular configuration detector with non-straight interdigital areas 7A and 7B, firstly to suggest the main rules for implementation of the invention that will be quite clear to an expert in the subject, and secondly to demonstrate that the cutouts 9 in the conducting layer 8 are not necessarily located along the center line of the spaces between areas 7A and 7B. The result is some simplification of the design, for example used to optimize lithographic efficiencies (the total length of cutouts 9) and the optical absorption (minimum non-metallized surface).

The spaces between contact areas 7A and 7B are laid out so as to give an approximately constant width L as suggested in FIG. 5 in order to avoid the existence of areas with a higher electrical field, in other words areas in which the low frequency noise level would be greater than the noise level indicated by Hooge's law.

It will be noticed that the thermal insulation areas 4 (the support arms in FIGS. 1 to 5) form a simple extension of areas 7A and 7B of the central part of the bolometer. This characteristic is a preferred configuration due to the resulting simplicity of manufacture.

In this way, firstly the electrical contacts on the bolometric material may be extended continuously (without continuity of layer 6) as far as contact areas 3 with the read circuit, and secondly this avoids thickening the thermal insulation arms by layer 6.

The ideal thermal resistance Rth of the bolometer, all other dimensions and materials being equivalent, is thus unchanged compared with document [3].

This preferred configuration is particularly suitable for the case in which the bolometric material is amorphous silicon (or a similar alloy) since this type of material has all qualities useful for making support arms and thermal insulation arms.

In the case in which the detectors in FIGS. 4 and 5 are included within a 50 µm side square, the thermal resolution of the bolometer shown on FIG. 4 according to the model described above is proportional to $1/(W.L.E)^{1/2}$, where typically L=L1=4 µm and W=W1, where W1 is close to 110 µm. For the bolometer shown on FIG. 5, L=L2=7.5 µm and W=W2, where W2 is close to 120 µm. Therefore the performance (NedT) compared with the prior reference state of the art (FIG. 4) is represented by the number $((L2.W2)/(L1.W1))^{1/2}$ which is close to 0.70.

Note that the improvement is partially related to the fact that according to the invention, contact areas 7A and 7B may be rejected on the outside margins of the detector, unlike in document [3] in which the width of the first conducting band at the edge of the detector should be about 4 µm, like the other bands, in order to obtain slightly more uniform absorption over the detector. This is explained by comparison with FIGS. 2 and 3 in which the electrodes are laid out in a space in which the length D is the same for FIGS. 2 and 3. This effect is relatively negligible for large pixels with dimensions larger than 50 µm, and becomes more sensitive when the detector dimensions are smaller.

Furthermore, the average optical absorption close to wave length of 10 µm is higher for the detector in FIG. 5. 90% to 95% absorption can be obtained with the detector in FIG. 4, and theoretically 100% can be obtained with the detector in FIG. 5 (on optically sensitive surfaces) for a layer of conducting material with an appropriate layer resistance (R square), occupying all or most all of the available space, as is possible with the invention. It is reasonable to estimate an average gain of the order of 5% over a useful band varying from 8 µm to 14 µm, considering the optically inactive areas of the detector (essentially areas 3).

Furthermore, the adjustment of "Rsquare" which is necessary for optical optimization, makes it possible to reduce the thickness of the conducting layer used in the invention by a factor of the order of 2 compared with a detector according to document [3]. The same is true for areas 4 in the case of the preferred configurations shown in FIGS. 1 to 5, in which these areas (support arm) only comprise the layer of bolometric material and the conducting layer. The result is an increase in the thermal resistance, all other things being equal, by the order of 9% to 17% depending on the material and thickness configurations suggested in the example given later.

Starting from a bolometer designed according to document [3] and improved according to the invention, a direct reduction is obtained depending on the selected example, of the order of 40% on the thermal resolution NedT (from +14% to +23% on the response and −30% on the noise). This improvement level is valid regardless of the resistive bolometric material and the electrode configuration.

FIGS. 6A to 10B diagrammatically illustrate the steps in manufacturing a preferred embodiment of a bolometric detector according to the invention.

Although the following description applies to a single detector, a large number of detectors can be formed simultaneously.

Variants are possible, for example concerning the order in which different layers are stacked and the order in which the lithographic levels are chained and the choice of materials and deposition processes, the associated etching and dimensions and configurations of the various detector elements.

FIGS. 6A, 7A, 8A, 9A and 10A show steps in the manufacture of the detector according to a section through its structure. This section is section AA (in chain dotted lines) in the top views in FIGS. 6B, 7B, 8B, 9B and 10B representing configurations of lithographic levels associated with the various steps. The surfaces limited by thick lines on FIGS. 6B, 7B, 8B, 9B and 10B delimit areas protected by each lithographic mask. Symmetry between pixels in the example shown is advantageous for the layout of matrices of such pixels or bolometers on the substrate that contains the read circuit.

Those skilled in the art will easily deduce other configurations of lithographic levels from these Figures, that can be used to make other detectors according to the invention.

The various techniques mentioned are not usually described in detail since they consist of techniques conventionally used in microelectronics.

In a first step (FIGS. 6A and 6B), a metallic and reflecting layer 2 made for example of aluminum or gold is deposited directly on the surface of substrate 1 which may for example be made of silicon and comprise active or passive elements (not shown) of the read circuit associated with the detector.

Figure 6A:
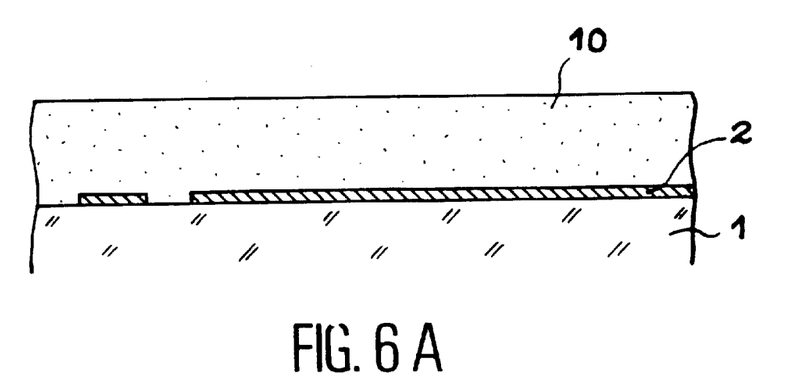
Figure 6B:
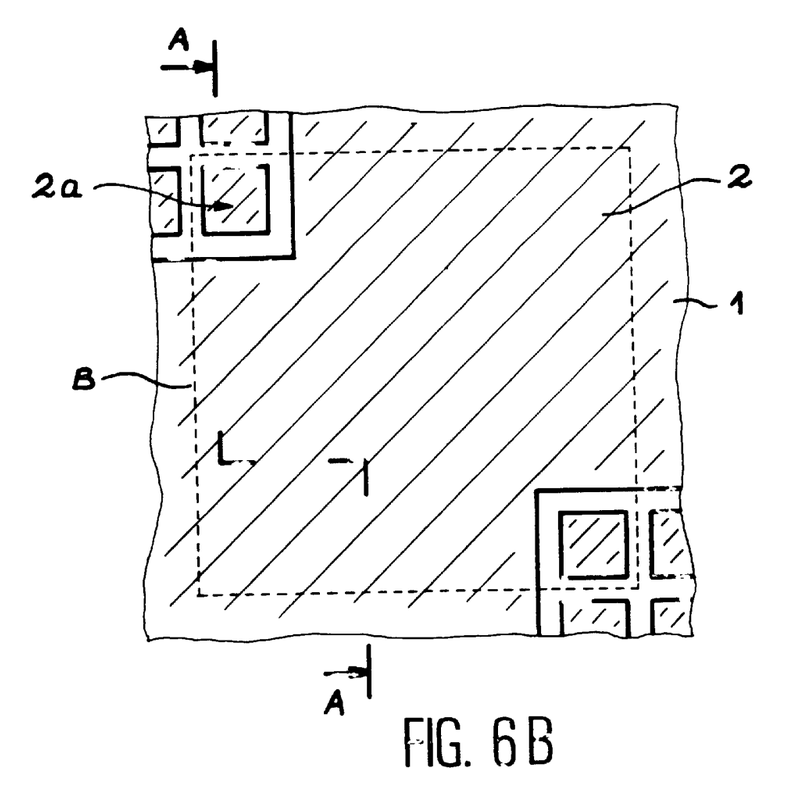

A reflector is defined by etching this layer 2 with traditional means, using a first lithographic level shown in FIG. 6B.

Three superposed layers are then deposited in sequence according to the preferred configuration:

a first layer 10 (FIG. 6A) made from a material capable of being eliminated later, for example a polymer such as a polyimide, this polyimide layer 10 being annealed at a temperature such that it can support the rest of the process, the thickness of this layer preferably being about 2.5 $\mu$m to enable the quarter wavelength effect of the optical cavity induced between the reflector and the detector body that is then produced at the surface of the polyimide layer, a second layer 5 (FIG. 7A) composed of a bolometric material, for example doped amorphous silicon, or a similar alloy, for example with a thickness of the order of a few tens to a few hundreds of nanometers, the resistivity and thickness of this layer 5 being determined using criteria that go beyond the framework of the invention, for example the electrical resistance or the mechanical strength of the detector, and, a third electrically insulating layer 6 (FIG. 7A) for example made of silicon nitride or preferably silicon oxide (to improve the dielectric insulation quality).

Figure 7A:
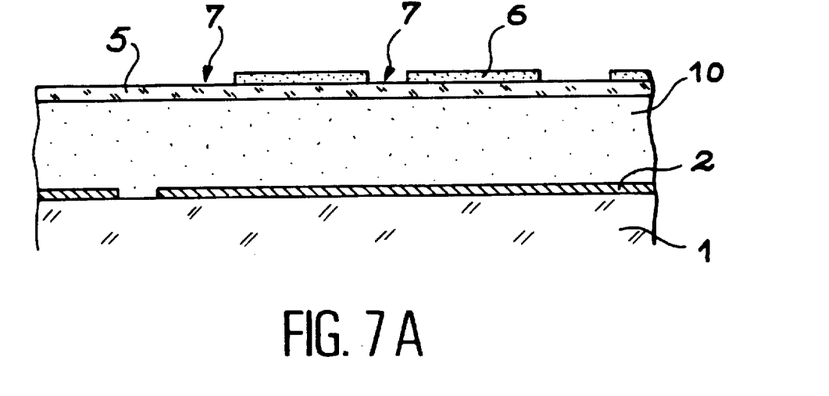

The thickness of this layer 6 must be sufficient (of the order of 5 nm to 20 nm) to resist operating voltages applied to the detector (which are of the order of a few volts) without prejudicial leaks between the electrodes and the bolometric material.

This layer 6 may also be composed of a polymer, for example polyimide.

Note that the square B delimited by the dashed lines in FIGS. 6A to 10B delimits an elementary detector or bolometer or detector pixel and that areas such as area 2A (FIG. 6B) are formed starting from layer 2 in preparation for subsequent formation of contact areas or connection structures 3.

Figure 7B:
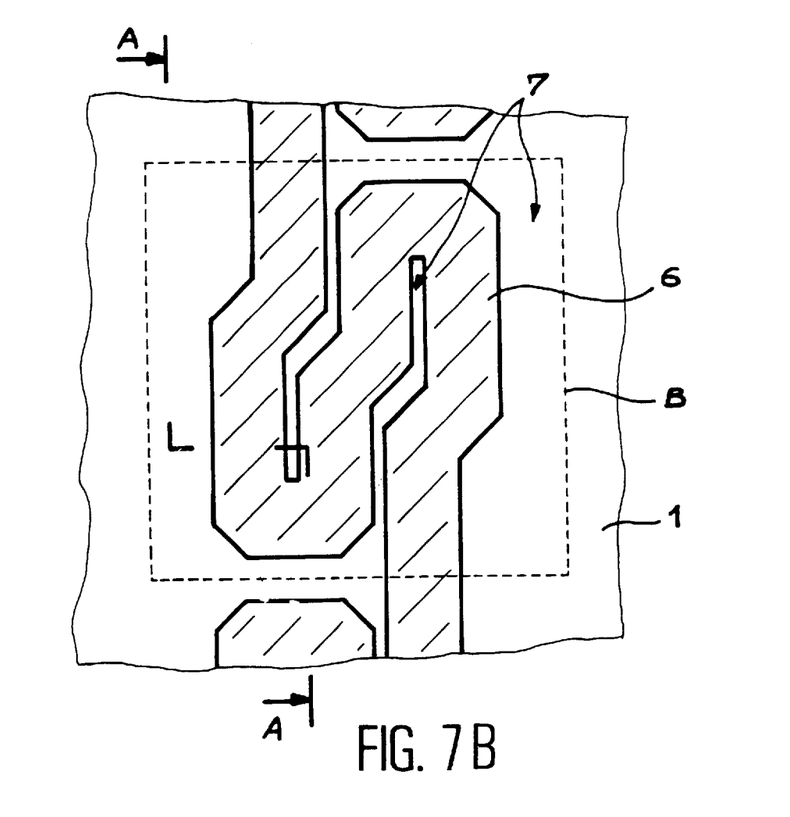

The layer 6 is eliminated from areas 7 (which are used later to obtain areas 7A, 7B and 7C mentioned above) using a second lithographic level shown in FIG. 7B, using an appropriate etching process which is selective with respect to the bolometric material. The width of these areas 7 is not necessarily uniform, but is as small as possible and for example is equal to 1 $\mu$m in the narrowest sections. Furthermore, in a preferred configuration shown in FIG. 7B, this layer 6 is eliminated from the surfaces that will later be occupied by the support arms 4 and contact areas 3 with the read circuit.

An electrically conducting layer 8 is then deposited over the entire surface, for example made of a metal such as titanium nitride, this material being easy to obtain in very thin layers with a predefined resistivity using traditional methods. The resistance (Rsquare) of this layer 8 is adjusted depending on the nature of the design of the next lithographic layer.

Figure 8A:
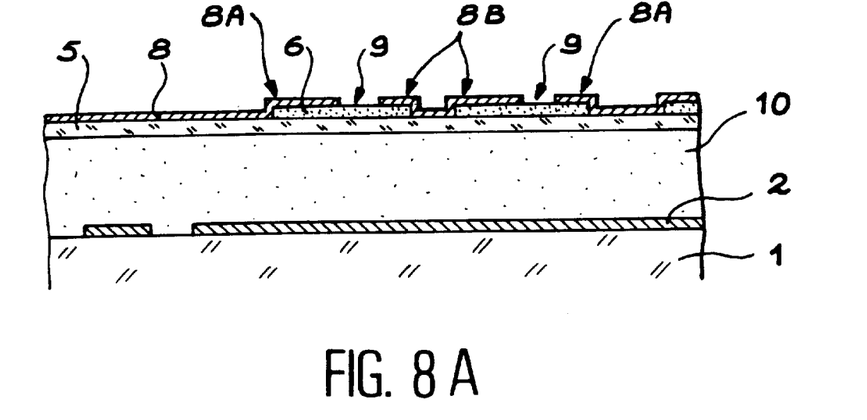
Figure 8B:
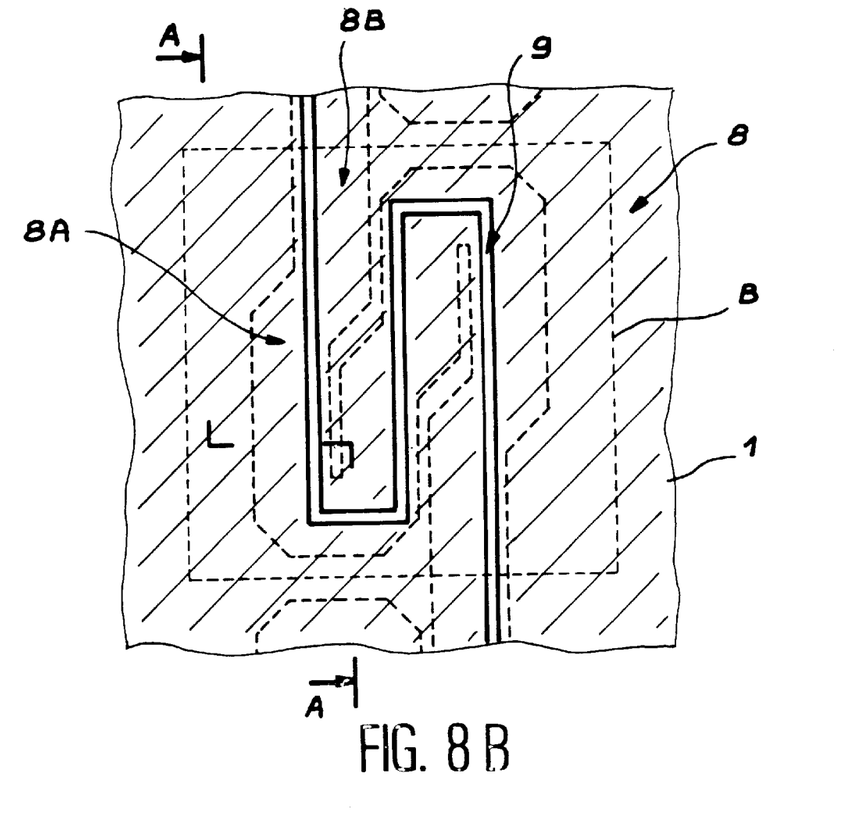

A third lithographic level shown in FIG. 8B is used to selectively etch conducting layer 8 with respect to the layer 6 by traditional means to obtain areas 8A and 8B, as shown in FIG. 8A. Thus, the electrodes are separated from the detector. This lithographic level is advantageously drawn with relatively narrow open spaces 9, for example 2 $\mu$m wide.

If the spaces and widths of metallic patterns after etching are similar, the layer 8 is adjusted to about 200 $\Omega$/square.

One possible way of forming this layer 8 is to use 8 nm of titanium nitride with a resistivity of the order of 130 $\mu\Omega$cm to 160 $\mu\Omega$cm.

In the preferred configuration with narrow spaces, about 4 nm of this same material can be used and in this preferred configuration, the support arms 4 may for example comprise 50 to 100 nm of amorphous silicon and 4 nm of TiN.

Using typical values of thermal conductivity equal to 2 W/mK for silicon and 5 W/mK for TiN (taking account of its resistivity), a simple calculation shows that the difference in thermal resistivity between the two previous cases is between about 9% and 17% depending on the thickness of amorphous silicon. Therefore, the invention gives a non-negligible advantage in this preferred configuration of conducting patterns and conformation of support arms.

Figure 9A:
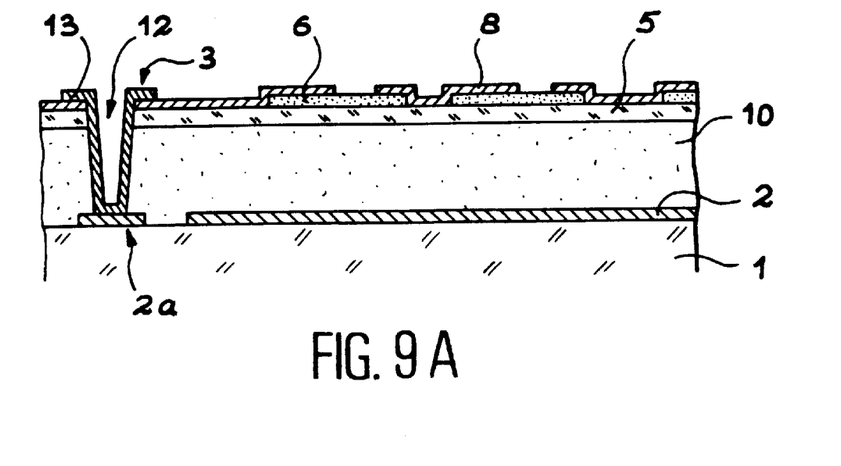

Openings 12 were formed by etching, preferably dry, through layers 8, 5 and 10 successively by means of a fourth lithographic level, until reaching some metallized patterns 2a in the first lithographic level as shown on FIG. 9A.

A conducting layer 13, for example made of a metal such as aluminum, is then deposited uniformly. This layer continuously covers the bottom and sides of the openings 12. To facilitate this overlap, openings 12 are preferably made with inclined sides according to a known configuration.

Figure 9B:
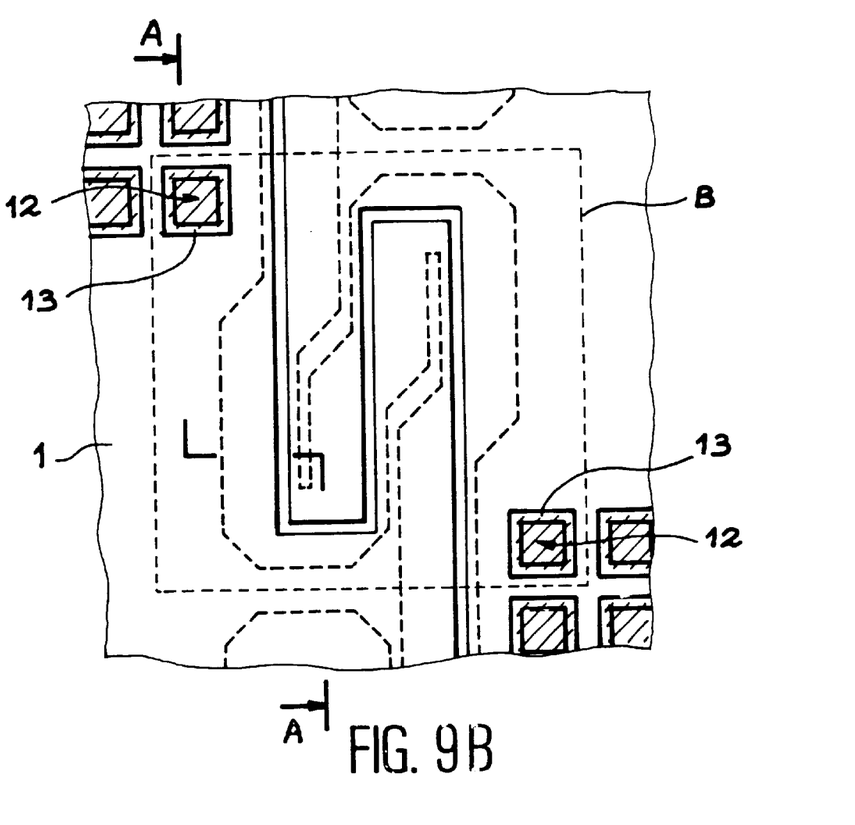

This layer 13 is etched very selectively with respect to layers 8 and 6 by a standard process using the fifth lithographic level, that can be seen with the fourth lithographic level in FIG. 9B.

Figure 10A:
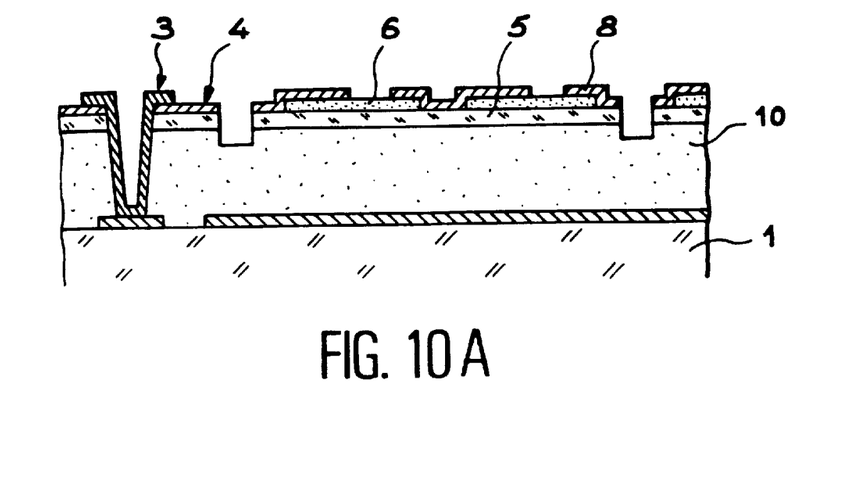
Figure 10B:
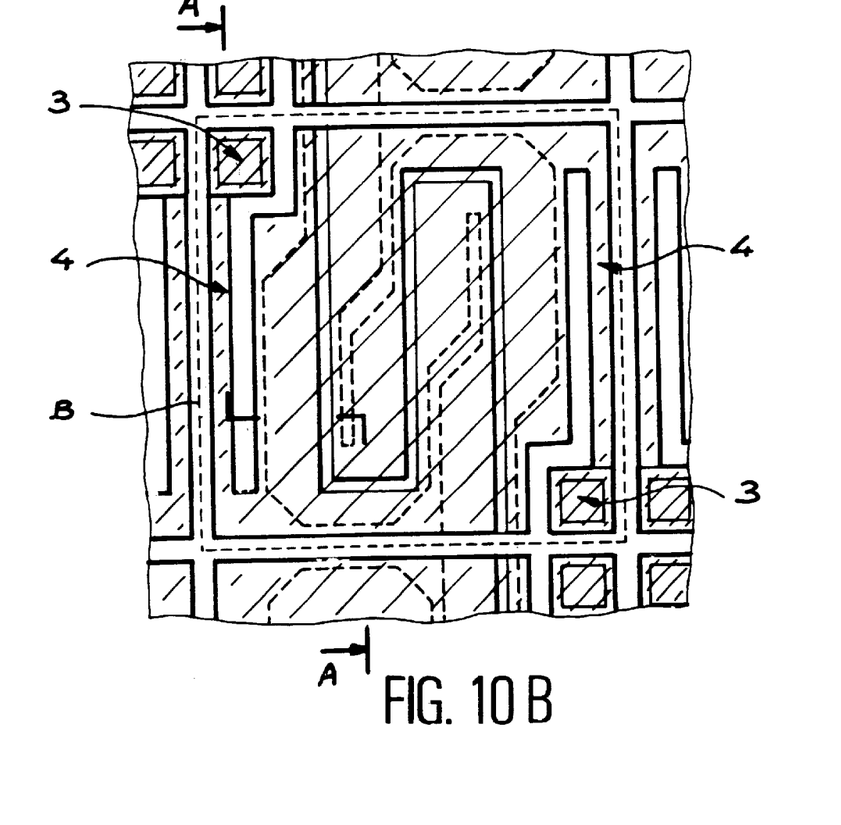

A sixth lithographic level shown on FIG. 10B in the preferred configuration is used to define the contours of each detector and thermal isolation arms by etching (preferably dry etching) layers 8, 6 and 5. This etching is typically continued into the thickness of the polyimide layer 10 as shown in FIG. 10A, in order to completely cut out layers 8, 6 and 5 following the mask contours.

The imagery circuits are then separated in the form of individual chips and finally the polyimide layer 10 is eliminated using an oxygen plasma or similar combustion process in order to release the bolometers that are then only held in place by pillars 3 extended by support arms 4.

If layer 6 is composed of a polymer, it will also be eliminated during this step. In this case, layers 5 and 8 are isolated from each other by a space in which there is no material.

The manufacturing process is terminated by normal operations for the transfer onto a base equipped with appropriate metallization and then bonding of the electrical connections of the circuit and finally integration in a containment in which a vacuum is formed and which is equipped with a window transparent to infrared radiation.

What is claimed is:

1. In a Bolometric detector having a layer of bolometric material and at least two electrodes formed facing the same face of this layer of bolometric material an improvement comprising: each of the two electrodes including at least one first area and at least one second area, in that the second areas belonging to the two electrodes respectively are electrically insulated from each other and electrically insulated from the layer of bolometric material, and in that the first areas respectively belonging to the two electrodes are at a spacing from each other and are in electrical contact with this layer of bolometric material.

2. An improvement according to claim 1, further comprising a layer of electrically insulated material disposed intermediate said second area of said two electrodes and said bolometric material.

3. An improvement according to claim 2, wherein said electrically insulated material is chosen from the group comprising silicon nitride and silica.

4. An improvement according to claim 1, wherein said second areas are electrically insulated from the layer of bolometric material by a space in which there is no material.

5. An improvement according to claim 1, wherein said bolometric material is chosen from the group comprising amorphous silicon, vanadium oxides, amorphous SiGe and $Si_xGe_yC_z$ where $x \geq 0$, $y \geq 0$, $z \geq 0$ and $x+y+z=1$.

6. An improvement according to claim 1, wherein said electrically conducting material is titanium nitride.

7. An improvement according to claim 1, having a microbridge structure.

8. A bolometric detector according to claim 1, wherein said detector includes a matrix structure having at least two said bolometric detectors.

* * * * *